(12) United States Patent
Fujikawa

(10) Patent No.: US 6,862,071 B2
(45) Date of Patent: Mar. 1, 2005

(54) ELECTROOPTIC DEVICE AND ELECTRONIC DEVICE

(75) Inventor: Shinsuke Fujikawa, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/351,537

(22) Filed: Jan. 27, 2003

(65) Prior Publication Data

US 2003/0174271 A1 Sep. 18, 2003

(30) Foreign Application Priority Data

Mar. 18, 2002 (JP) ........................................ 2002-074302

(51) Int. Cl.$^7$ ............................................ G02F 1/1345
(52) U.S. Cl. .................................................... 349/152
(58) Field of Search ................................ 349/149–152, 349/43; 257/59

(56) References Cited

U.S. PATENT DOCUMENTS 5,742,074 A * 4/1998 Takizawa et al. ............. 257/59
5,745,202 A * 4/1998 Yamauchi et al. .......... 349/110
6,406,946 B1 * 6/2002 Takizawa et al. ........... 438/149
6,680,773 B2 * 1/2004 Nakashima et al. ........ 349/151

FOREIGN PATENT DOCUMENTS

JP           8-76136 A      3/1996
JP       2000-162632 A    6/2000

* cited by examiner

Primary Examiner—Toan Ton
(74) Attorney, Agent, or Firm—Oliff & Berridge, PLC

(57) ABSTRACT

The invention provides an electrooptic device and an electronic device in which a region that does not directly contribute to the display can be narrowed by improving the layout of peripheral circuits. In a TFT array substrate of a liquid crystal device, unit circuits that form shift register circuits are formed in unit-circuit forming regions spaced from each other in the X-direction, and the X-direction pitch of the circuit units is shorter than the X-direction pitch of pixel rows. Consequently, a wide free region in which the unit circuits 101e are not formed can be formed between the unit-circuit forming regions, and identification marks can be formed in the region.

10 Claims, 18 Drawing Sheets

(A)

(B)

ELECTROOPTIC DEVICE AND ELECTRONIC DEVICE

BACKGROUND OF THE INVENTION

1. Field of Invention

The present invention relates to an electrooptic device and an electronic device in which a peripheral circuit is formed on a substrate. More particularly, the present invention relates to a technique of laying out the peripheral circuit on the substrate.

2. Description of Related Art

In recent years, electrooptic devices represented by liquid crystal devices and EL (electroluminescence) display panels have attracted attention as display sections in electronic devices, such as portable telephones, portable computers, and video cameras. For example, as shown in FIG. 18, in an active matrix liquid crystal device using a thin-film transistor as a pixel switching element, of such electrooptic devices, a TFT array substrate 10 having pixel electrodes and pixel-switching TFTs (both not shown) formed on a transparent substrate, and a counter substrate 20 having counter electrodes (not shown) formed on a transparent substrate are bonded with a sealing material 107 with a predetermined space therebetween, and liquid crystal serving as an electrooptic substance is held between the substrates.

As shown in FIG. 19, when the orthogonal directions are designated X- and Y-directions, a plurality of pixels 100a are formed at a predetermined pitch and in a matrix on the TFT array substrate 10 corresponding to the intersections of a plurality of data lines 6a extending in the Y-direction and a plurality of scanning lines 3a extending in the X-direction, and a region in which these pixels 100a are arranged in a matrix forms an image display region 10a in which actual display is produced.

In a portion adjoining the image display region 10a in the Y-direction, of a region around the image display region 10a, a data-line driving circuit 101 is formed which includes shift register circuits 101b, sample hold circuits 101c having analog switches to be operated in response to signals output from the shift register circuits 101b, six image signal lines 110d corresponding to six-phase image signals, and the like. In the data-line driving circuit 101, the shift register circuits 101b, the sample hold circuits 101c, and the like are formed in the regions extending in the Y-direction from the forming regions of the data lines 6a and the pixel rows connected thereto in a one-to-one correspondence with the data lines 6a and pixel rows connected thereto. Consequently, the X-direction pitch of the shift register circuits 101b and the like is equal to the X-direction pitch of the pixel rows.

As shown in FIGS. 18 and 19, scanning-line driving circuits 104 are formed on the periphery of the image display region 10a so that they are connected to the scanning lines 3a, and a plurality of lines 109 are routed from terminals 102 so as to supply signals to the scanning-line driving circuits 104 and the data-line driving circuit 101.

Conductive electrodes 9g are formed in the regions on the periphery of the image display region 10a that overlap with the counter substrate 20, and are electrically connected to the counter electrodes of the counter substrate 20 through conductive materials 106 held between the substrates. Therefore, a constant voltage (DCCOM) supplied to the terminals 102 of the TFT array substrate 10 can be supplied to the counter electrodes of the counter substrate 20.

In the liquid crystal device 100 having such a configuration, when trouble occurs during the production process of the TFT array substrate 10, and the TFT malfunctions, a display defect, such as a point defect and a line defect, is caused, and therefore, it is necessary to follow the production history. For this reason, in the liquid crystal device 100, identification marks 40 of, for example, 2 mm 2 mm that indicate the part numbers of the TFT array substrate 10 and the liquid crystal device 100 are put on the TFT array substrate 10. The identification marks 40 are required to be visible or mechanically readable after the TFT array substrate 10 and the counter substrate 20 are bonded together. Therefore, the identification marks 40 are formed in an extended portion 10c of the TFT array substrate 10 that protrudes from the edge of the counter substrate 20 so that the terminals 102 are exposed.

SUMMARY OF THE INVENTION

In the liquid crystal device 100, a so-called frame region 100b lies around the image display region 10a, and does not directly contribute to the display. When the device is mounted in a portable device, it is required that the image display region 10a should be large and that the entire display should be small for size reduction of the device. Moreover, it is required that as many devices as possible should be produced from one glass substrate in order to reduce the production cost. For this purpose, the liquid crystal device 100 is required to decrease the proportion of the width of the frame region 100b to the total size of the liquid crystal device 100. However, since the data-line driving circuit 101, the scanning-line driving circuits 104, the lines 109, the conductive electrodes 106, the identification marks 40, and the like are formed around the image display region 10a, the peripheral region (frame region) cannot be narrowed further.

In view of the above problems, an object of the present invention is to provide an electrooptic device and an electronic device in which a region that does not directly contribute to the display can be narrowed by improving the layout of peripheral circuits.

In order to overcome the above problems, an electrooptic device of the present invention can include on the substrate at least an image display region in which a plurality of pixels are arranged at a predetermined pitch in two X- and Y-directions intersecting on a substrate, and a peripheral circuit disposed in a region adjacent in the Y-direction to the image display region and a plurality of unit circuits corresponding to a plurality of pixel rows arranged in the X-direction are arranged at a predetermined pitch in the X-direction at least in a portion of the peripheral circuit. The plurality of unit circuits are formed offset in the X-direction from regions extending in the Y-direction from the corresponding pixel rows, so that a free region in which the unit circuits are not formed is formed in a portion of the region adjacent in the Y-direction to the image display region, the portion being adjacent in the X-direction to the portion in which the unit circuits are formed.

In the present invention, by forming a plurality of unit circuits corresponding to a plurality of pixel rows offset in the X-direction from the regions extending in the Y-direction from the forming regions of the corresponding pixel rows, dispersed spaces are gathered into a free region in which a unit circuit is not formed, and an identification mark, a conductive electrode, and the like are placed in the free region. Therefore, the regions around the image display region that have heretofore been occupied by the identification mark, the conductive electrode, and the like can be placed in the region in which the peripheral circuit is formed, and this can narrow the peripheral region (frame region).

In the present invention, by forming the unit circuits in a plurality of unit-circuit forming regions spaced from each other in the X-direction in the peripheral circuit, the free region may be formed between the unit-circuit forming regions. In this case, while the spaces have heretofore been formed on both sides in the X-direction of the peripheral circuit, since such spaces are gathered between the unit-circuit forming regions in this embodiment, a wide free region can be formed. Therefore, the peripheral region can be narrowed by placing identification marks, conductive electrodes, and the like in the free region.

In the present invention, for example, since the X-direction pitch of the unit circuits in the peripheral circuit is shorter than the X-direction pitch of the pixel rows, the free region can be formed on both sides or one side adjoining in the X-direction the portion in which the unit circuits are formed. This makes it possible to narrow the region occupied by the peripheral circuit, and to place an identification mark, a conductive electrode, and the like in the free region thereby formed. Consequently, the peripheral region can be narrowed.

In the present invention, it is preferable that the X-direction pitch of the unit circuits be shorter than the X-direction pitch of the pixel rows in the peripheral circuit and that the unit circuits are formed in a plurality of unit-circuit forming regions spaced in the X-direction so that the free region is formed between the unit-circuit forming regions. In this case, it is possible to narrow the region occupied by the peripheral circuit, and to gather the spaces on both sides of the peripheral circuit between the unit-circuit forming regions so as to form a wide free region. Since an identification mark, a conductive electrode, and the like can be placed in the free region, the peripheral region can be narrowed.

In the present invention, it is preferable that the free region be used as a region in which an identification mark having various data recorded therein is formed.

In the present invention, when the substrate has a conductive electrode that is electrically connected to an electrode on a counter substrate opposing the substrate through a conductive material held between the substrates, the free region may be used as a region in which the conductive electrode is formed.

In the present invention, when the substrate has a conductive electrode that is electrically connected to an electrode on a counter substrate opposing the substrate through a conductive material held between the substrates, the free region may be used as a region in which the conductive electrode is formed and a region in which an identification mark having various data recorded therein is formed.

In the present invention, the plurality of pixels can sometimes include a pixel electrode and a pixel-switching thin-film transistor. In this case, the peripheral circuit is, for example, a data-line driving circuit in which the unit circuits are formed in a one-to-one correspondence with data lines electrically connected to sources of the pixel-switching thin-film transistors.

In the present invention, the plurality of pixels can sometimes include a pixel electrode and a pixel-switching thin-film transistor. In this case, the peripheral circuit may be, for example, a scanning-line driving circuit in which the unit circuits are formed in a one-to-one correspondence with scanning lines electrically connected to gates of the pixel-switching thin-film transistors.

In the present invention, for example, the substrate holds liquid crystal as an electrooptic substance.

An electrooptic device of the present invention can be used to form a display section in an electronic device such as a portable computer or a potable telephone.

BRIEF DESCRIPTION OF THE DRAWINGS

The invention will be described with reference to the accompanying drawings, wherein like numerals reference like elements, and wherein.

DESCRIPTION OF PREFERRED EMBODIMENTS

Figure 18:
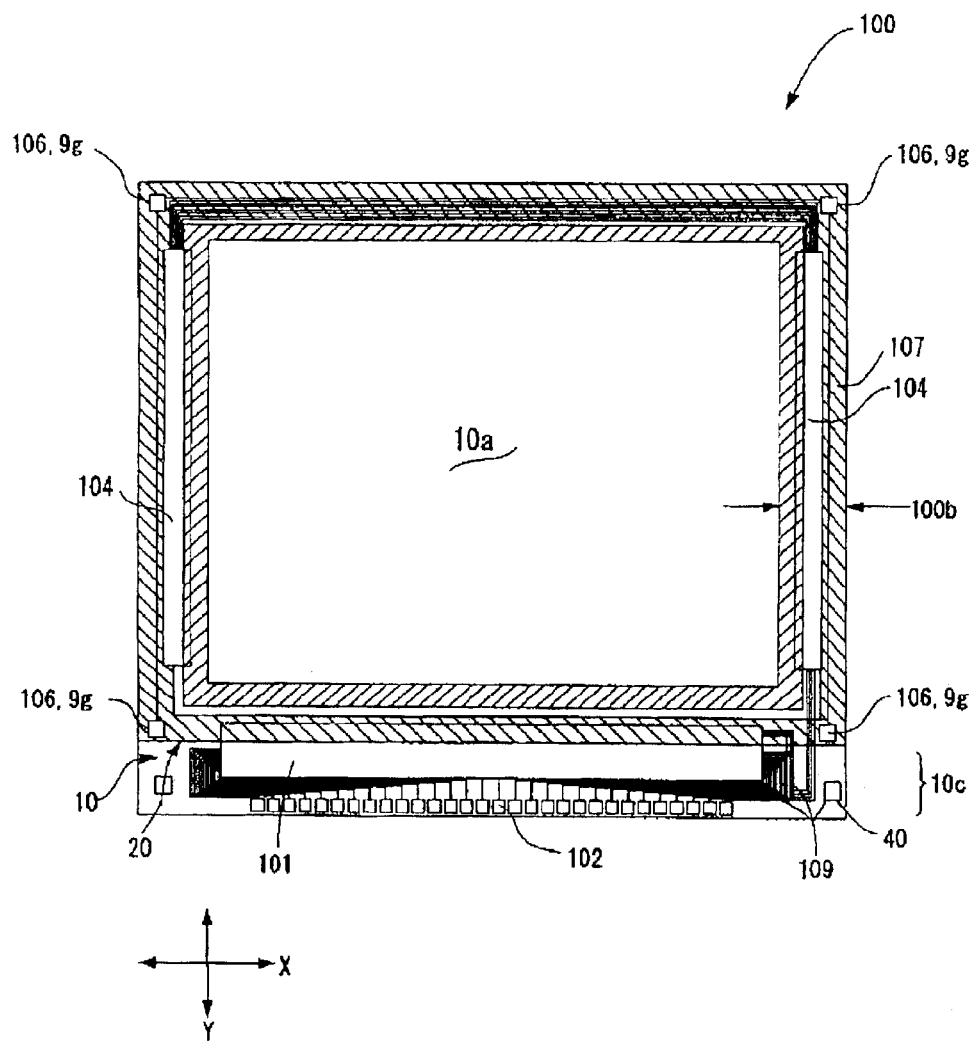
FIG. 18 is a plan view of a conventional liquid crystal device and components formed thereon, as viewed from the side of a counter substrate.
Figure 19:
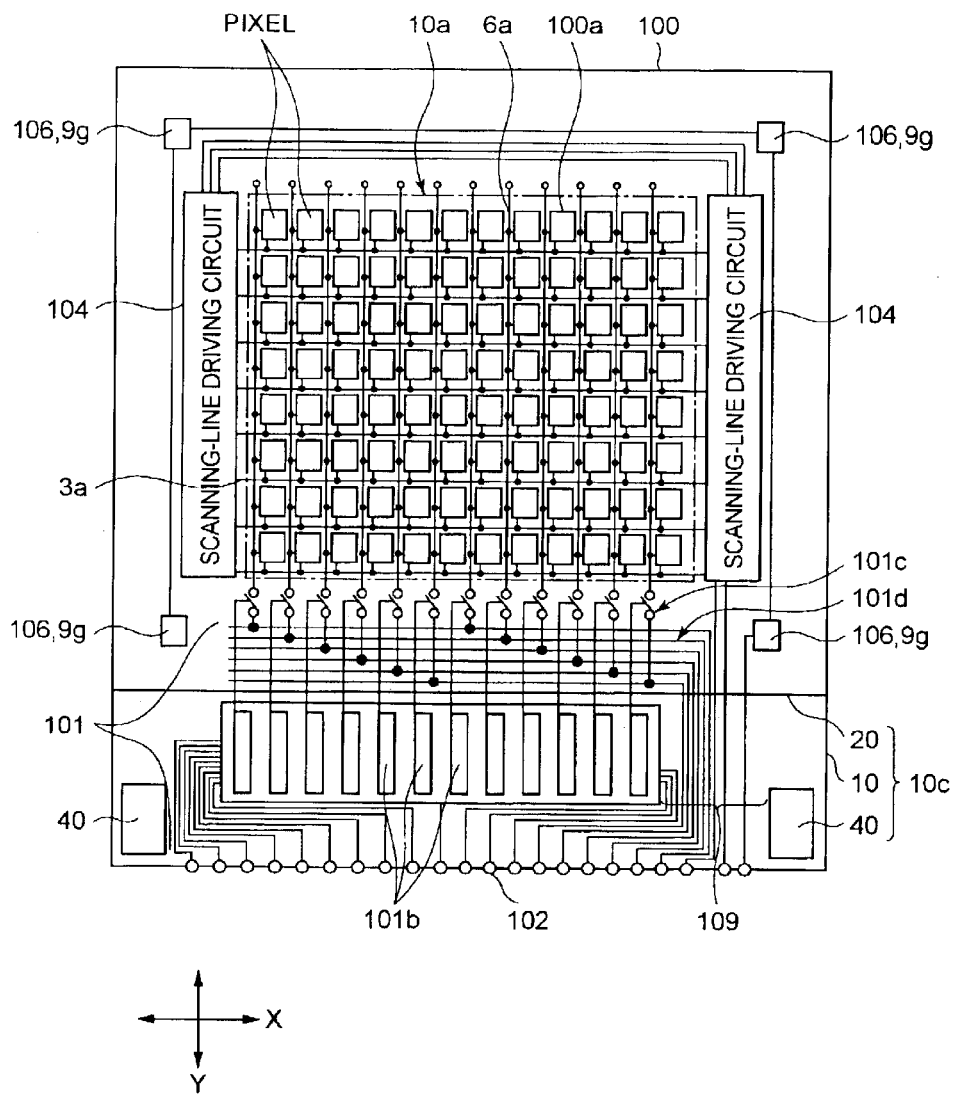
FIG. 19 is a block diagram schematically showing the configuration of a TFT array substrate used in the liquid crystal device shown in FIG. 18.

An embodiment in which the present invention is applied to a liquid crystal device as a typical electrooptic device will be described with reference to the drawings. In the drawings, layers and members are shown on different scales in order that they have sizes such as to be viewable in the drawings. Since the basic configuration of the liquid crystal device to which the present invention is applied is common to that described with reference to FIGS. 18 and 19, the components having similar functions are denoted by the same reference numerals in the description. While, when two directions intersecting on the substrate plane are designated X- and Y-directions, scanning lines extend in the X-direction and data lines extend in the Y-direction in the following description, conversely, the present invention may be applied to a case in which the scanning lines extend in the Y-direction and the data lines extend in the X-direction.

Figure 1:
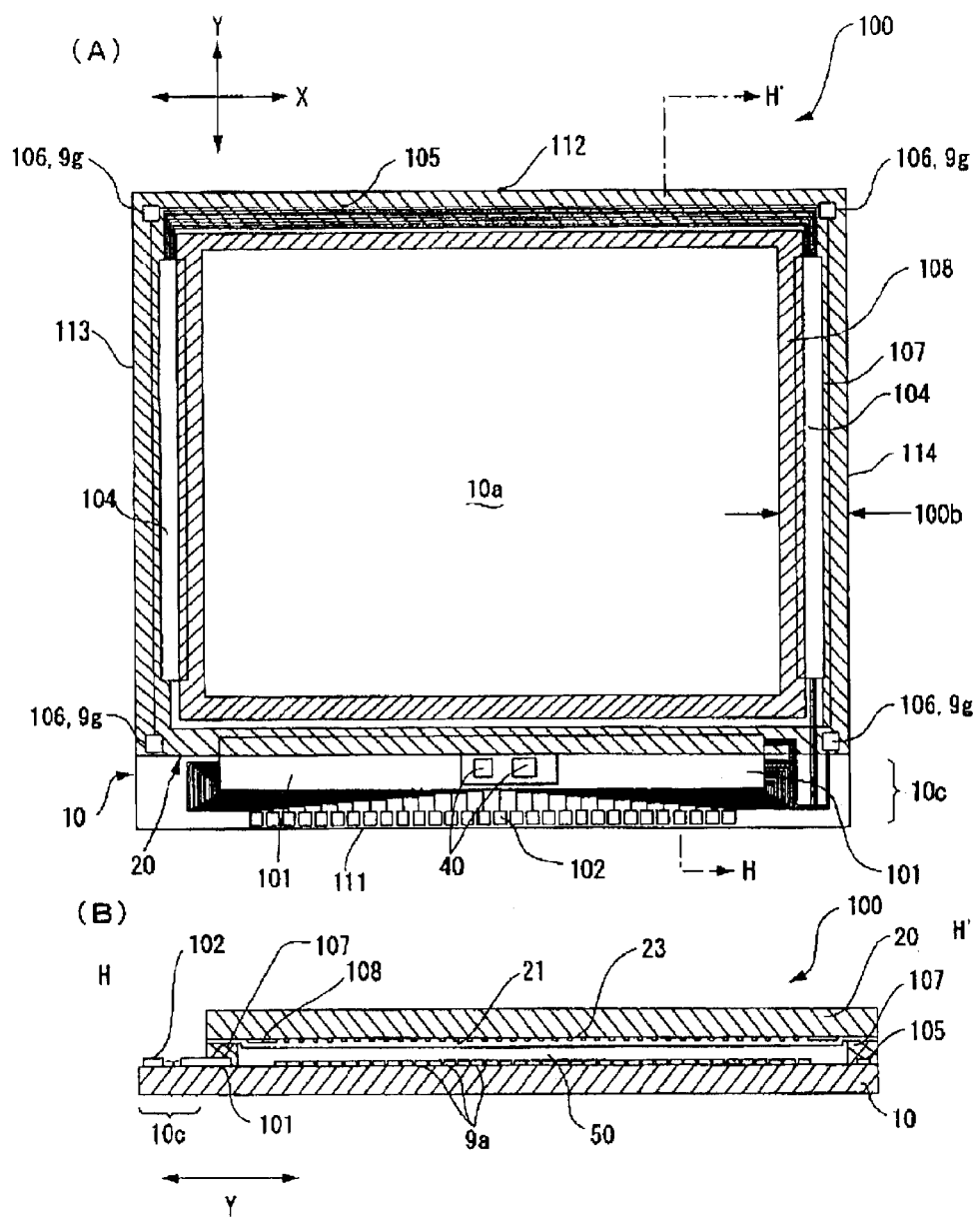
FIG. 1(A) is a plan view of a liquid crystal device and components formed thereon according to a first embodiment of the present invention, as viewed from the side of a counter substrate.
FIG. 1(B) is a cross-sectional view, taken along line H-H' in FIG. 1(A)

FIG. 1(A) is a plan view of a liquid crystal device and components formed thereon, as viewed from the side of a counter substrate, and FIG. 1(B) is a cross-sectional view of the liquid crystal device including the counter substrate, taken along line H-H' in FIG. 1(A).

In FIG. 1(A), a sealing material 107 (an area shaded by downward-slanting lines in FIG. 1(A)) is formed on a TFT array substrate 10 of a liquid crystal device 100 (electrooptic device) along the edge of a counter substrate 20. The TFT array substrate 10 and the counter substrate 20 are bonded with a predetermined space therebetween by the sealing material 107. On the outer periphery of the TFT array substrate 10, a data-line driving circuit 101 is formed along a substrate edge 111 so as to overlap with a part of the scaling material 107, and scanning-line driving circuits 104 are formed along substrate edges 113 and 114. Multiple terminals 102 are formed on a region 10c of the TFT array substrate 10 that protrudes from the counter substrate 20. A plurality of lines 105 are formed along a substrate edge 112 of the TFT array substrate 10 on the opposite side of the substrate edge 111 so as to connect the scanning-line driving circuits 104 on both sides of an image display region 10a.

Conductive electrodes 9g and conductive materials 106 are formed in areas corresponding to four corners of the counter substrate 20 for electrical continuity between the TFT array substrate 10 and the counter substrate 20. The number of the conductive electrodes 9g, and the like may be appropriately changed.

In a case in which the delay of scanning signals to be supplied to the scanning lines does not raise a problem, of course, the scanning-line driving circuit 104 may be provided on one side only. On the contrary, the data-line driving circuit 101 may be placed along both side edges of the image display region 10a.

As shown in FIG. 1(B), the TFT array substrate 10 and the counter substrate 20 are bonded with a predetermined space therebetween by the sealing material 107, and liquid crystal 50 is held in the space. The sealing material 107 can be an adhesive made of a photosetting or thermosetting resin for bonding the TFT array substrate 10 and the counter substrate 20 at the peripheries thereof, and can be mixed with a gap material, such as glass fibers or glass beads, that ensures a predetermined distance between the substrates.

Although will be described in greater detail below, pixel electrodes 9a are formed in a matrix on the TFT array substrate 10. In contrast, a shielding film 108 for framing is made of a shielding material inside the sealing material 107 on the counter substrate 20. Moreover, a shielding film 23, called a black matrix or a black stripe, is formed in regions of the counter substrate 20 opposing the lengthwise and breadthwise boundaries of the pixel electrodes 9a formed on the TFT array substrate 10, and counter electrodes 21 made of an ITO film are formed thereon.

For example, in a case in which the liquid crystal device 100 having such a configuration is used in a projection-type display device (liquid crystal projector), three liquid crystal devices 100 are used as RGB light valves, respectively. In this case, since RGB light components separated through an RGB color-separating dichroic mirror enter the liquid crystal devices 100, respectively, the liquid crystal devices 100 do not have a color filter. However, in a case in which the display device 100 is used as a color display device of an electronic device, such as a mobile computer, a portable telephone, or a liquid crystal television, as will be described later, RGB color filters and protective films therefore are formed in the regions of the counter substrate 20 opposing the pixel electrodes 9a, although they are not shown.

The electrical configurations and operations of the TFT array substrate 10 and the liquid crystal device 100 will be described with reference to FIGS. 2, 3, and 4.

Figure 2:
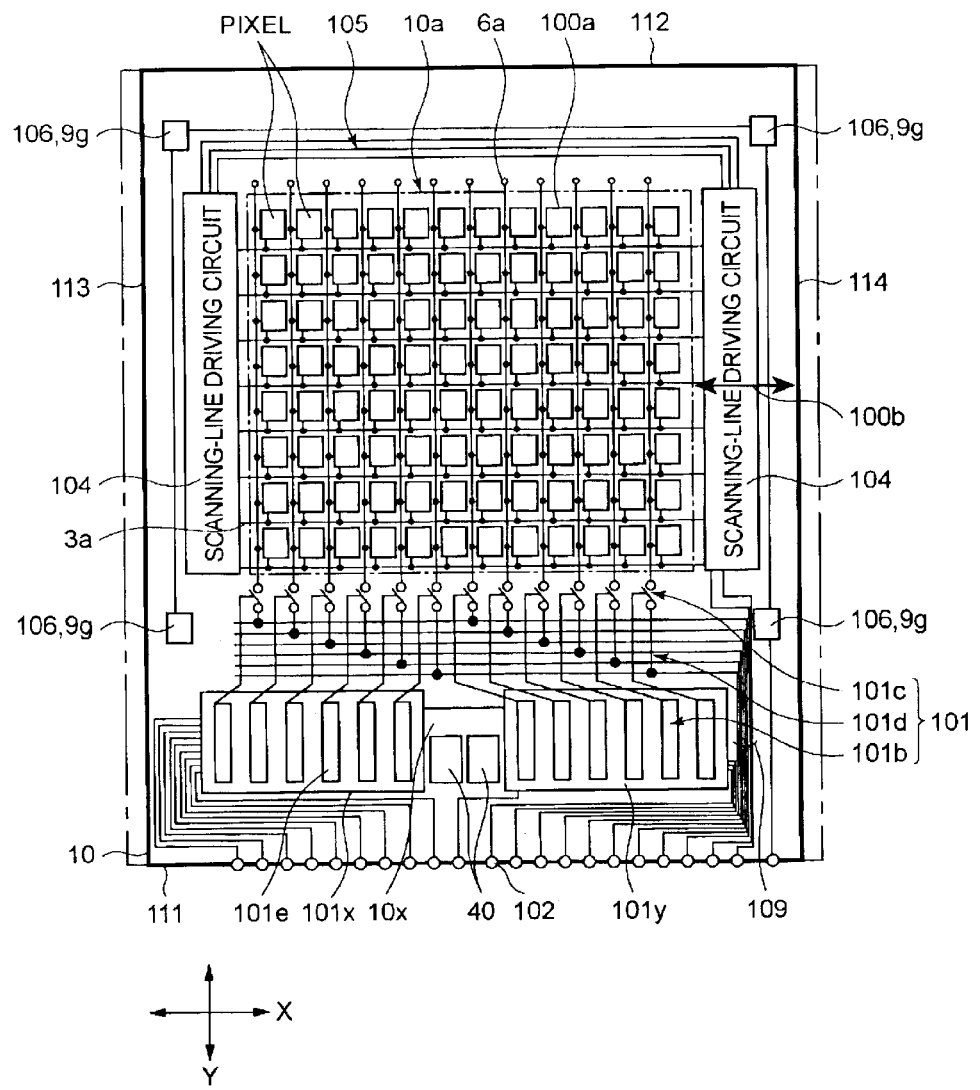
FIG. 2 is a block diagram schematically showing the configuration of a TFT array substrate used in the liquid crystal device shown in FIG. 1.
Figure 3:
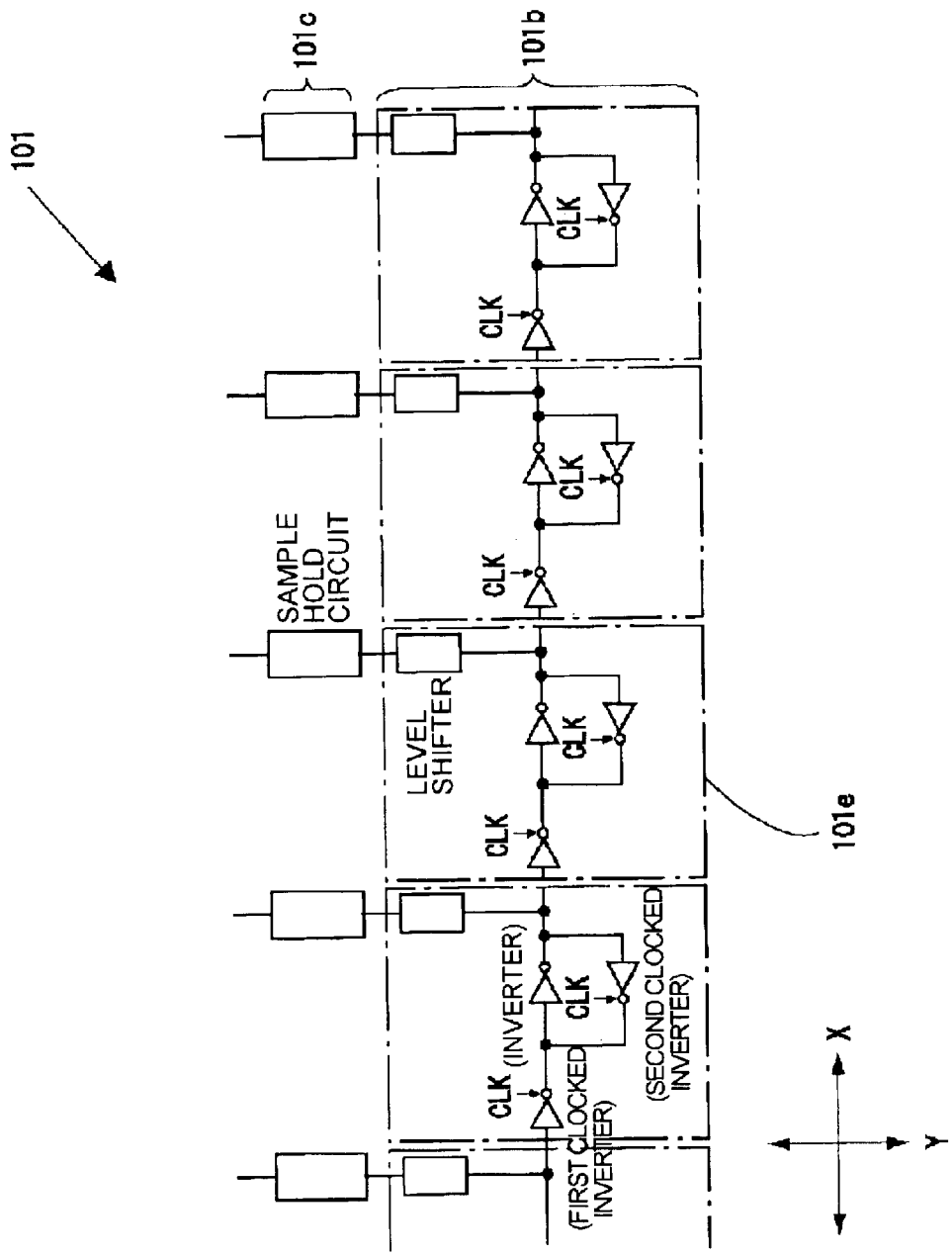
FIG. 3 is an explanatory view of a data-line driving circuit shown in FIG. 2.

FIG. 2 is an exemplary block diagram schematically showing the configuration of the driving-circuit built-in TFT array substrate 10 used in the liquid crystal device 100. FIG. 3 is an explanatory view of the data-line driving circuit 101 formed on the TFT array substrate 10. FIG. 4 is an equivalent circuit diagram of various elements and lines in a plurality of pixels formed in a matrix so as to constitute the image display region 10a of the liquid crystal device 100. In FIG. 2, the outline (substrate edges 113 and 114) of the liquid crystal device 100 of this embodiment is shown by a solid line, and the outline of a conventional liquid crystal device is shown by a one-dot chain line.

As shown in FIG. 2, when two directions intersecting on the TFT array substrate 10 are designated X- and Y-directions, a plurality of pixels 100a are arranged at a predetermined pitch and in a matrix corresponding to the intersections of a plurality of data lines 6a extending in the Y-direction and a plurality of scanning lines 3a extending in the X-direction. A region in which these pixels 100a are arranged in a matrix forms an image display region 10a in which display is actually performed.

Multiple terminals 102 made of a metal film, such as an aluminum film, a metal suicide film, or a conductive film, such as an ITO film, are formed along a substrate edge 111 of the TFT array substrate 10, and a constant voltage, a modulation image signal, and various driving signals are input thereto. A plurality of lines 109 made of, for example, a low-resistance metal film, such as an aluminum film, for driving a data-line driving circuit 101 and scanning-line driving circuits 104, are routed from these terminals 102.

In a portion of a peripheral region (frame region 100b) of the image display region 10a adjacent to the image display region 10a in the Y-direction, a data-line driving circuit 101 which includes shift register circuits 101b, sample hold circuits 101c each having an analog switch that operates in response to a signal output from the corresponding shift register circuit 101b, six image signal lines 101d corresponding to six-phase image signals, and the like, is formed.

In the data-line driving circuit 101, the shift register circuits 101b, the sample hold circuits 101c, and the like are in a one-to-one correspondence with the data lines 6a and pixel rows connected thereto. In other words, as shown in FIG. 3, a sample hold circuit 101c is provided for one data line 6a. In the shift register circuit 101b, an inverter, two clocked inverters, and a level shifter are provided for one data line 6a. In the following description, an inverter, two clocked inverters and a level shifter are referred to a unit circuit 101c.

Figure 4:
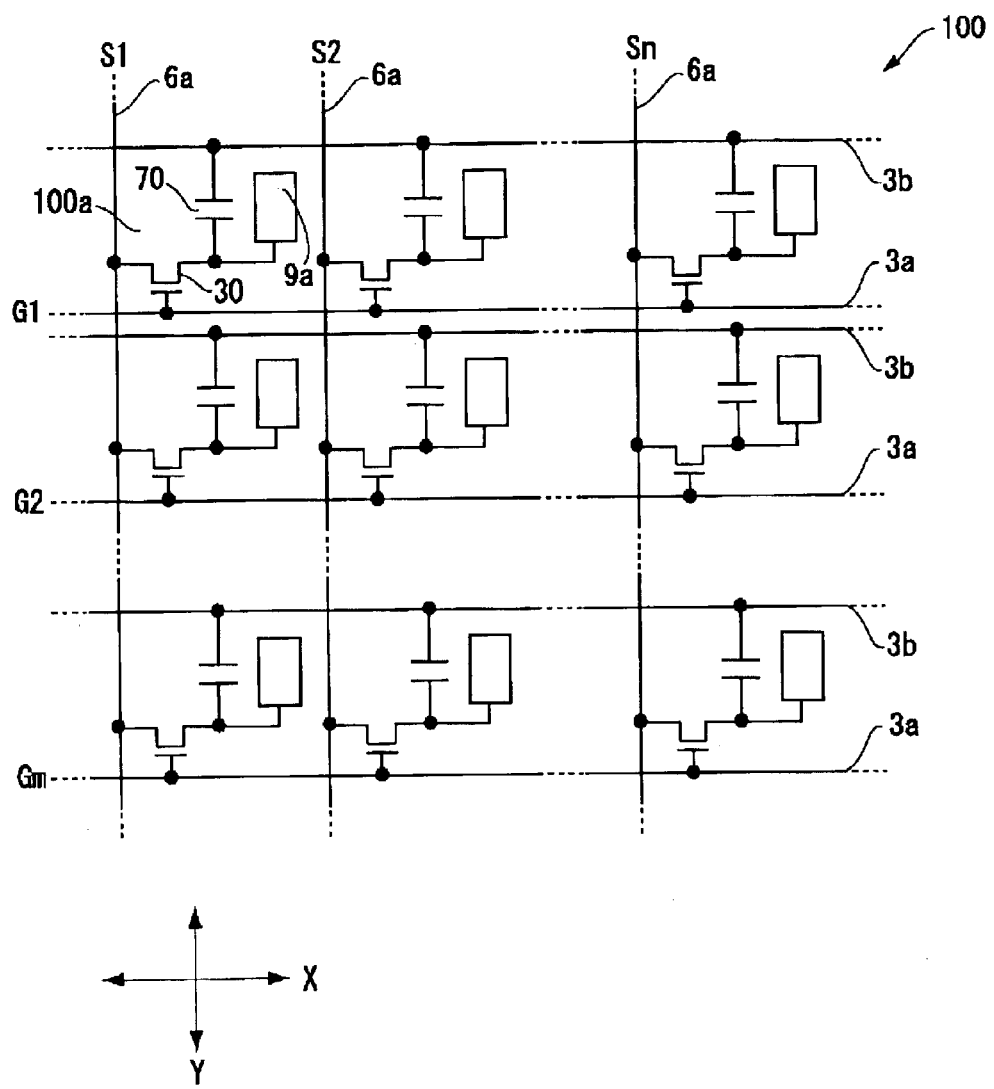
FIG. 4 is an equivalent circuit diagram showing various elements, lines, and the like in a plurality of pixels arranged in a matrix in an image display region shown in FIG. 2.

In each of the plurality of pixels 100a formed in a matrix in the image display region 10a of the liquid crystal device 100, as shown in FIG. 4, a pixel electrode 9a and a pixel-switching TFT 30 for controlling the pixel electrode 9a are formed, and a data line 6a for supplying a pixel signal is electrically connected to a source of the TFT 30. Pixel signals S1, S2, ¼, Sn to be written in the data lines 6a are line-sequentially supplied in that order. A scanning line 3a is electrically connected to a gate of each TFT 30, and scanning signals G1, G2, ¼, and Gm are line-sequentially applied to the scanning lines 3a in pulses at a predetermined timing in that order. The pixel electrode 9a is electrically connected to a drain of the TFT 30. The pixel signals S1, S2, ¼, and Sn supplied from the data lines 6a are written into the pixels at a predetermined timing by activating the TFTs 30 serving as the switching elements only for a predetermined period. The pixel signals S1, S2, ¼, and Sn thus written in the liquid crystal through the pixel electrodes 9a are held for a predetermined period between the pixel electrodes 9a and the counter electrodes 21 of the counter substrate 20 which has been described with reference to FIG. 1(B).

In order to prevent the held pixel signals from leaking, storage capacitors 70 (capacitors) are sometimes added on the TFT array substrate 10 in parallel with liquid crystal capacitors formed between the pixel electrodes 9a and the counter electrodes 21. For example, the voltage of the pixel electrode 9a is held in the storage capacitor 70 for a time three orders of magnitude longer than the time during which the source voltage is applied. This improves the charge retention characteristics, and allows the liquid crystal device 100 to produce a high-contrast display. The storage capacitor 70 may be formed between the data line 6a and a capacitor line 3b serving as a line for forming the capacitor or between the data line 6a and the above-described scanning line 3a.

Figure 5:
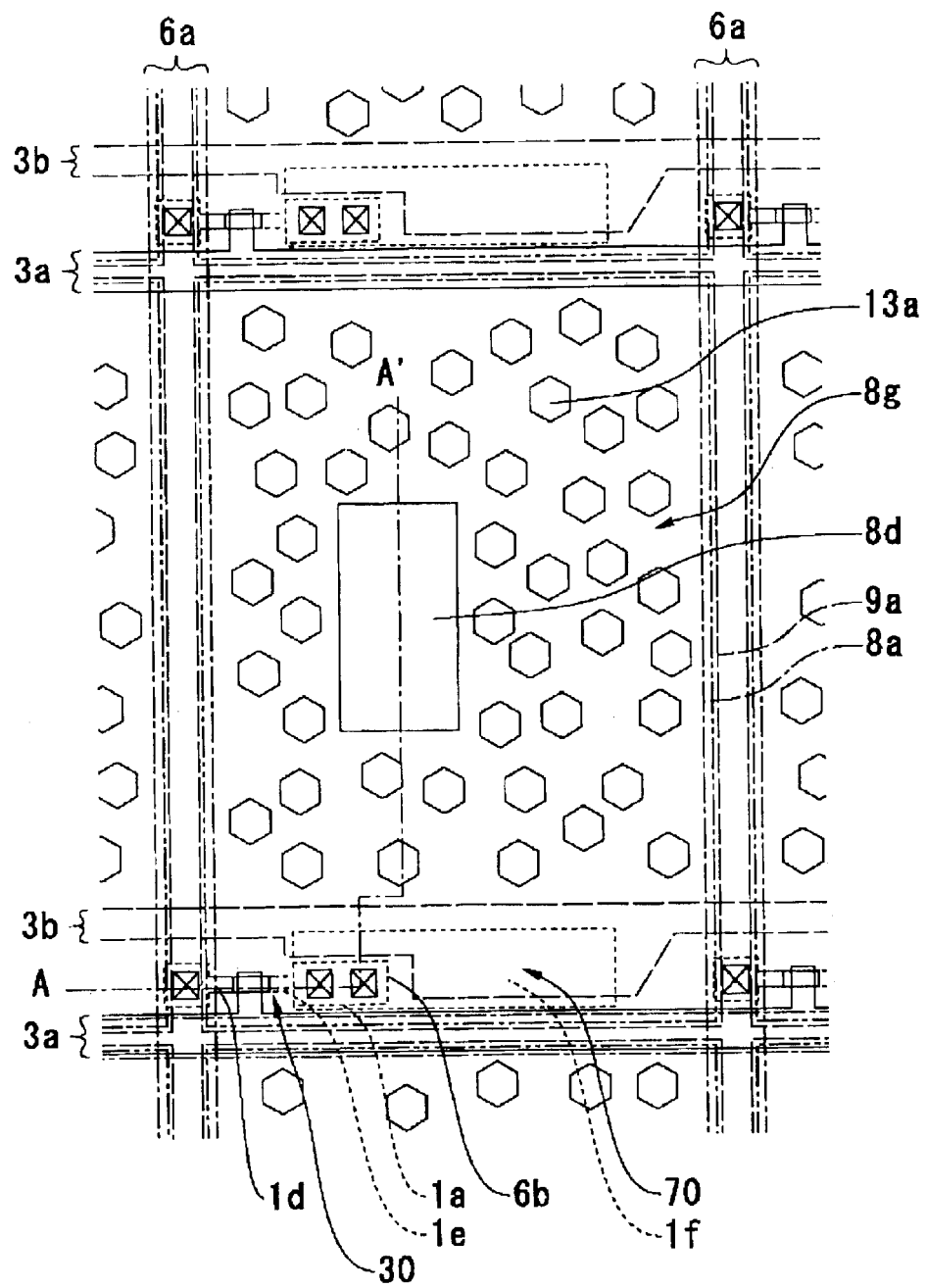
FIG. 5 is a plan view of the pixels shown in FIG. 4.
Figure 6:
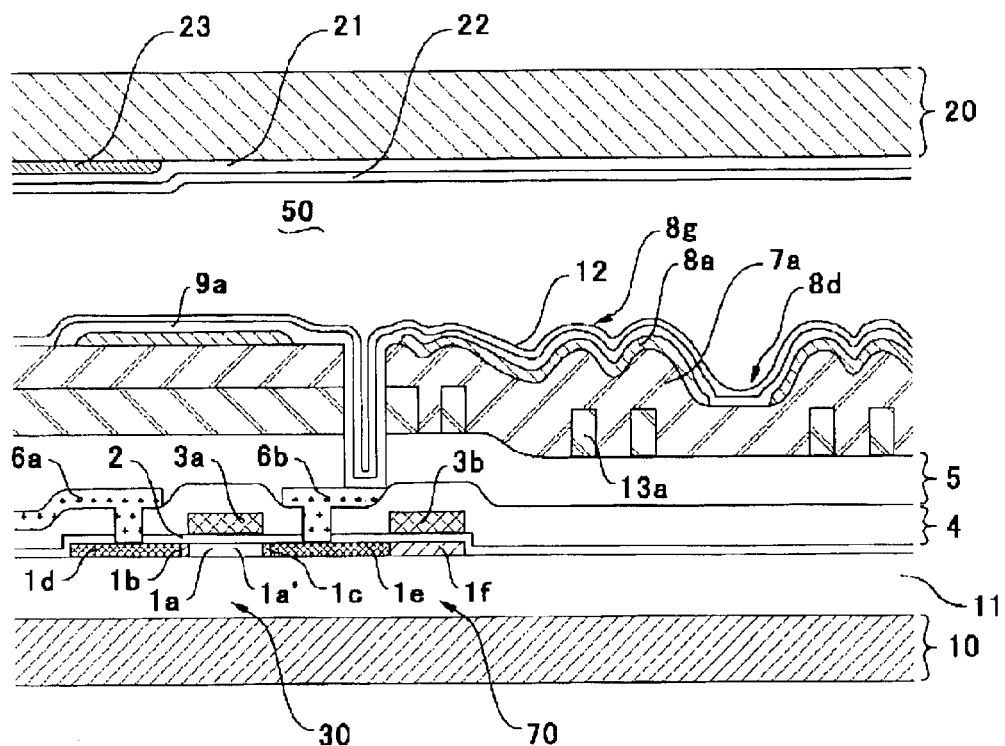
FIG. 6 is a cross-sectional view, taken along line A-A' in FIG. 5.

FIG. 5 is a plan view of the adjoining pixels on the TFT array substrate. FIG. 6 is an explanatory view showing the cross-section taken along line A-A' in FIG. 5 and the cross section of the liquid crystal sealed between the TFT array substrate and the counter substrate.

In FIG. 5, a plurality of pixel electrodes 9a made of a transparent ITO (Indium Tin Oxide) film are formed in a matrix on the TFT array substrate 10, and pixel-switching TFTs 30 are connected to the pixel electrodes 9a, respectively. Data lines 6a, scanning lines 3a, and capacitor lines 3b are formed along the lengthwise and breadthwise boundaries of the pixel electrodes 9a, and the TFTs 30 are connected to the data lines 6a and the scanning lines 3a. That is, each data line 6a is electrically connected to a heavily doped source region 1d of the TFT 30 via a contact hole, and a projecting portion of each scanning line 3a forms a gate electrode of the TFT 30. Each storage capacitor 70 has a structure in which an extended portion 1f of a semiconductor film 1a forming the pixel-switching TFT 30 is made conductive to serve as a lower electrode 41, and the capacitor line 3b extends as an upper electrode on the lower electrode 41.

As shown in FIG. 6, in the TFT array substrate 10, a transparent substrate 10b is used as a base, and a protective underlayer 11 made of a silicon oxide film (insulating film) having a thickness of 300 nm to 500 nm is formed on the surface of the transparent substrate 10b. An island-shaped semiconductor film 1a of 30 nm to 100 nm in thickness is formed on the surface of the protective underlayer 11. A gate insulating film 2 made of a silicon oxide film having a thickness of approximately 50 nm to 150 nm is formed on the surface of the semiconductor film 1a, and a scanning line 3a of 300 nm to 800 nm in thickness is formed on the surface of the gate insulating film 2. An area of the semiconductor film 1a opposing the scanning line 3a with the gate insulating film 2 therebetween serves as a channel region 1a'. A source region including a lightly doped source region 1b and a heavily doped source region 1d is formed on one side of the channel region 1a', and a drain region including a lightly doped drain region 1c and a heavily doped drain region 1e is formed on the other side.

An interlayer insulating film 4 made of a silicon oxide film having a thickness of 300 nm to 800 nm is formed on the front side of the pixel-switching TFT 30, and an interlayer insulating film 5 made of a silicon nitride film having a thickness of 100 nm to 300 nm is formed on the surface of the interlayer insulating film 4. A data line 6a of 300 nm to 800 nm in thickness is formed on the surface of the interlayer insulating film 4, and is electrically connected to the heavily doped source region 1d via a contact hole formed in the interlayer insulating film 4. A drain electrode 6b is formed simultaneously with the data line 6a on the surface of the interlayer insulating film 4, and is electrically connected to the heavily doped drain region 1e via a contact hole formed in the interlayer insulating film 4.

Irregularities-forming layers 13a, made of a light-transmissive photosensitive resin, are formed in a predetermined pattern on the interlayer insulating film 5. An upper-layer insulating film 7a made of a light-transmissive photosensitive resin is formed on the surfaces of the irregularities-forming layers 13a, and a light-reflecting film 8a made of an aluminum film or the like is formed on the surface of the upper-layer insulating film 7a. Therefore, an uneven pattern 8g in which the irregularities of the irregularities-forming layers 13a are reflected is formed on the surface of the light-reflecting film 8a, and the uneven pattern 8g is edgeless and smooth. While the irregularities-forming layers 13a have a hexagonal planar shape in FIG. 5, it should be understood that it may have various shapes, for example, a circular shape or an octagonal shape.

A pixel electrode 9a is formed on the light-reflecting film 8a. The pixel electrode 9a may be directly stacked on the surface of the light-reflecting layer 8a. The pixel electrode 9a is electrically connected to the drain electrode 6b via a contact hole formed through the upper-layer insulating film 7a, the irregularities-forming layer 13a, and the interlayer insulating film 5.

The light-reflecting film 8a has a rectangular light-transmissive window 8d in a part of a region two-dimensionally overlapping with the pixel electrode 9a. The pixel electrode 9a made of ITO lies at the light-transmissive window 8d, but the light-reflecting film 8a does not.

An alignment film 12 is formed of a polyimide film on the front side of the pixel electrode 9a. The alignment film 12 is formed by rubbing a polyimide film.

A capacitor line 3b opposes, as an upper electrode, an extended portion if (lower electrode) extending from the heavily doped drain region 1e with an insulating film (dielectric film), which is formed simultaneously with the gate insulating film 2, therebetween, thereby constituting a storage capacitor 70.

In the liquid crystal device 100 of this embodiment, since the light-reflecting film 8a is formed under the transparent pixel electrode 9a in this way, light incident from the counter substrate 20 is reflected by the TFT array substrate 10, and an image is displayed with light emitted from the counter substrate 10 (reflective mode). Furthermore, light traveling toward the light-transmissive window 8d, at which the light-reflecting film 8a is not formed, of light emitted from a backlight device (not shown) placed on the back side of the TFT array substrate 10, passes through the light-transmissive window 8d toward the counter substrate 20, and therefore, a transmissive-mode display is also possible.

While it is preferable that the TFT 30 have the above-described LDD structure, it may have an offset structure in which impurity ions are not implanted in the regions corresponding to the lightly doped source region 1b and the lightly doped drain region 1c. Alternatively, the TFT 30 may be of a self-aligned type in which high-concentration impurity ions are implanted by using the gate electrode (part of the scanning line 3a) as a mask, and heavily doped source and drain regions are formed in a self-aligned manner.

While this embodiment adopts a single gate structure in which only one gate electrode (scanning line 3a) of the TFT 30 is placed between the source and drain regions, it should be understood that two or more gate electrodes may be placed therebetween. In this case, the same signal is applied to the gate electrodes. By thus providing the TFT 30 with the dual gate (double gate) structure, the triple gate structure, or the structure having more gates, a leakage current can be avoided at joint portions between the channel region and the source and drain regions, and the current in an OFF state can be reduced. By providing at least one of the gate electrodes with an LDD structure or an offset structure, the OFF current can be further reduced, and this can achieve a stable switching element.

A light-shielding film 23, which is called a black matrix or a black stripe, is formed in regions of the counter substrate 20 opposing the lengthwise and breadthwise boundaries of the pixel electrodes 9a formed on the TFT array substrate 10, and counter electrodes 21 are formed of an ITO film thereon. An alignment film 22 made of a polyimide film is formed on the counter electrode 21. The alignment film 22 is formed by rubbing a polyimide film.

Referring again to FIG. 1(A), in the liquid crystal device 100 of this embodiment, peripheral circuits, such as the data-line driving circuit 101 and the scanning-line driving circuits 104, are formed on the periphery of the image display region 10a on the surface side of the TFT array substrate 10. The data-line driving circuit 101 and the scanning-line driving circuits 104 are basically composed of an N-channel TFT and a P-channel TFT, as shown in FIGS. 7 and 8.

Figure 7:
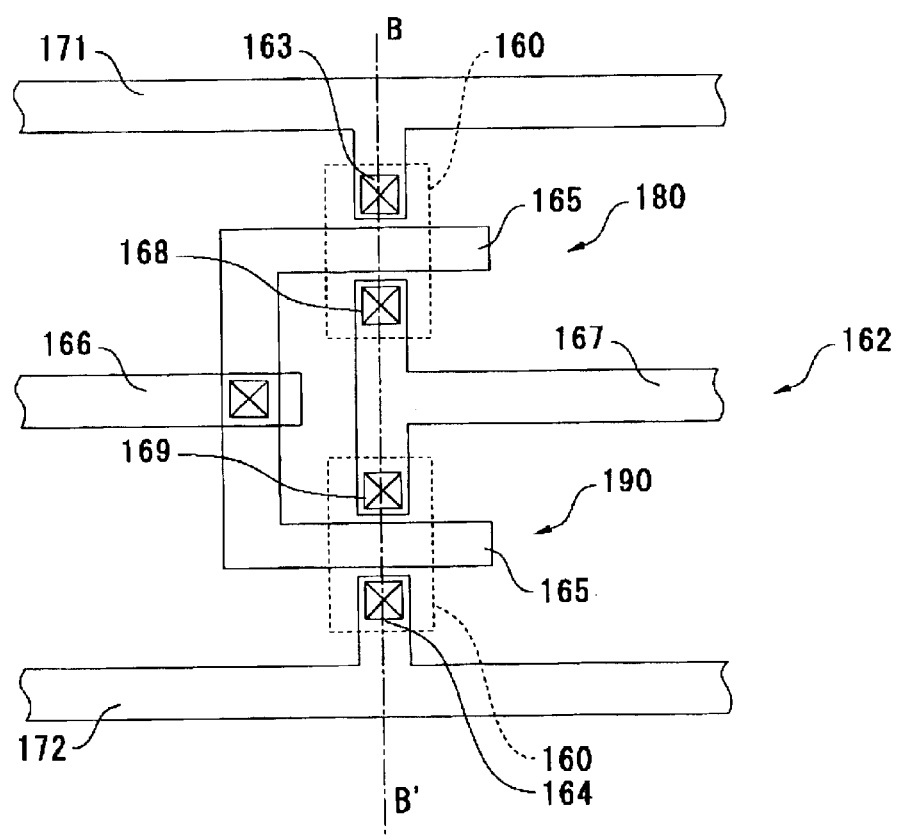
FIG. 7 is a plan view of a driving circuit shown in FIG. 1.

FIG. 7 is a plan view showing the structure of a TFT that constitutes the peripheral circuit, such as the scanning-line driving circuit 104 or the data-line driving circuit 101. FIG. 8 is a cross-sectional view of the TFT that constitutes the peripheral circuit, taken along line B-B' in FIG. 7.

Figure 8:
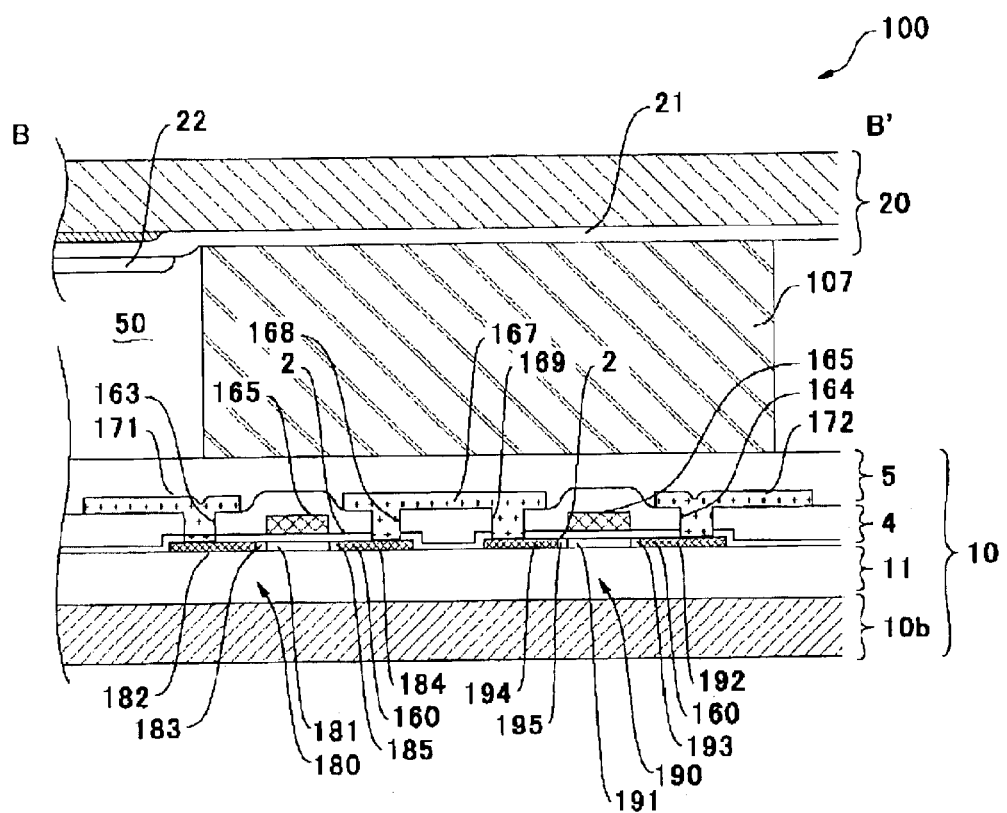
FIG. 8 is a cross-sectional view of a TFT for the driving circuit shown in FIG. 7.

In FIGS. 7 and 8, the TFT that constitutes the peripheral circuit is a complementary TFT composed of a P-channel TFT 180 and an N-channel TFT 190. Semiconductor films 160 that constitute the TFTs 180 and 190 for the driving circuits (their outlines are shown by a dotted line in FIG. 7) are formed like an island on the surface of the protective underlayer 11 of the transparent substrate 10b.

A high-potential line 171 and a low-potential line 172 are electrically connected to source regions of the semiconductor films 160 through contact holes 163 and 164 in the TFTs 180 and 190. An input line 166 is connected to a common gate electrode 165, and an output line 167 is electrically connected to drain regions of the semiconductor films 160 through contact holes 168 and 169, respectively.

Since such a peripheral circuit region is formed through processes similar to those of the image display region 10a, the interlayer insulating films 4 and 5 and the gate insulating film 2 are also formed in the peripheral circuit region. The TFTs 180 and 190 for the driving circuits have an LDD structure, in a manner similar to that of the pixel-switching TFT 30, and a source region including heavily doped source regions 182 and 192 and lightly doped source regions 183 and 193 and a drain region including heavily doped drain regions 184 and 194 and lightly doped drain regions 185 and 195 are provided on both sides of channel forming regions 181 and 191.

Figure 9:
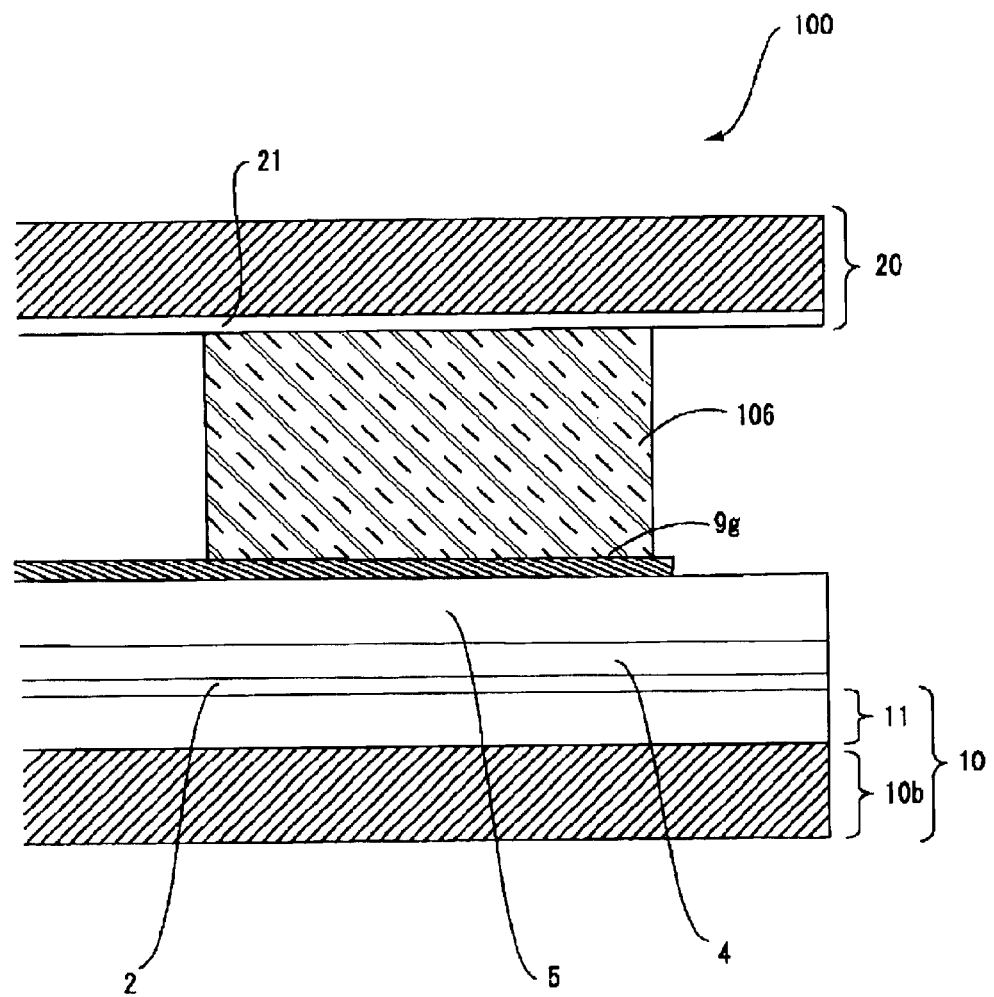
FIG. 9 is a cross-sectional view of a conducing portion between substrates shown in FIGS. 1 and 2.

FIG. 9 is a cross-sectional view of a conducting portion between the substrates in the liquid crystal device 100.

Referring again to FIGS. 1(A) and 2, a plurality of conductive electrodes 9g are formed in the region of the TFT array substrate 10 overlapping with the counter substrate 20, and are electrically connected to the counter electrodes 21 of the counter substrate 20 through the conductive material 106 sandwiched between the substrates, as shown in FIG. 9. The conductive material 106 can be made of an epoxy resin adhesive component mixed with conductive particles such as silver powder and gold-plated fiber. Therefore, a constant voltage (DCCOM) supplied to the terminals 102 of the TFT array substrate 10 can be supplied to the counter electrodes 21 of the counter substrate 20. Herein, the conductive electrodes 9g are made of an ITO film, in a manner similar to that of the pixel electrodes 9a.

Figure 10:
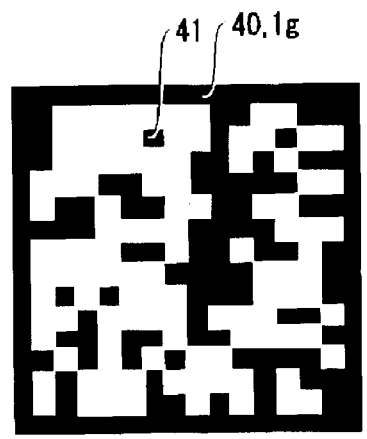
FIG. 10 is a plan view of an identification mark shown in FIGS. 1 and 2.
Figure 11:
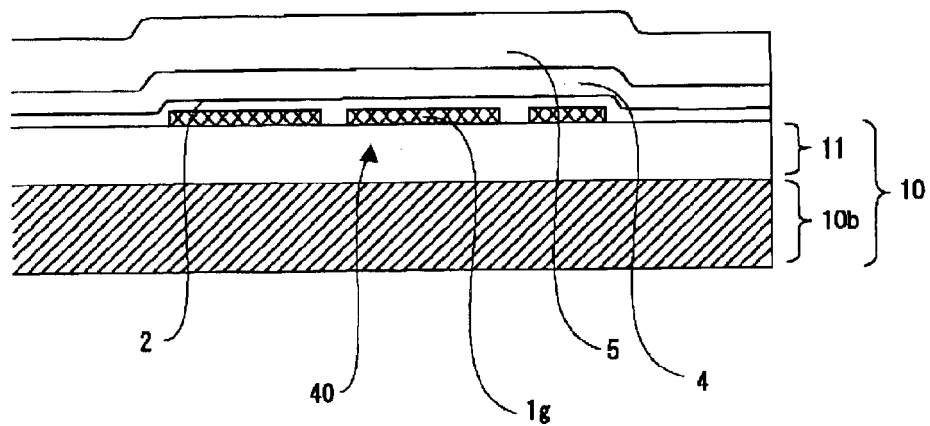
FIG. 11 is a cross-sectional view of a region in which the identification mark shown in FIG. 10 is formed.

FIGS. 10 and 11 are a plan view and a cross-sectional view, respectively, of an identification mark formed on the liquid crystal device 100.

Referring again to FIG. 2, in the data-line driving circuit 101, the shift register circuits 101b, the sample hold circuits 101c, and the like are formed in a one-to-one correspondence with the data lines 6a and the pixel rows connected thereto, and the sample hold circuits 101c are formed in regions extending in the Y-direction from the forming regions of the corresponding data lines 6a and the pixel rows connected thereto. For this reason, the X-direction pitch of the sample hold circuits 101c is equal to the X-direction pitch of the pixel rows.

In contrast, a plurality of unit circuits 101e that form the shift register circuits 101b are arranged in the X-direction. In this embodiment, a plurality of unit circuits 101e are formed in each of the two unit-circuit forming regions 101x and 101y that are spaced from each other in the N-direction. Consequently, the unit circuits 101e are formed offset in the X-direction from the regions extending in the Y-direction from the forming regions of the corresponding pixel rows. A free region 10x in which the unit circuits 101e are not arranged is formed between the unit-circuit forming regions 101x and 101y.

In this embodiment, two identification marks 40 shown in FIG. 10 are formed in the free region 10x between the unit-circuit forming regions 101x and 101y, and an identification mark is not formed on both sides of the data-line driving circuit 101.

The identification mark 40 is, for example, a VeriCode (two-dimensional code) in which data for a later follow-up survey on the production histories of the TFT array substrate 10 and the liquid crystal device 100 is recorded, and cells 41 that define data by the light reflectance are arranged in a matrix. The size of a cell 41 for one dot is 100 mm square, and such cells 41 are arranged in a 10 by 10 to 144 by 144 matrix. The identification marks formed on the TFT array substrate 10 of this embodiment are formed from a 14 by 14 matrix of cells.

As shown in FIG. 11, the identification mark 40 is made of, for example, a semiconductor film 1*g* remaining in a predetermined pattern on the surface of the protective underlayer 11 of the TFT array substrate 10. The semiconductor film 1*g* is a silicon film formed simultaneously with the semiconductor film 1*a* that forms an active layer of the TFT 30, and the gate insulating film 2 and the interlayer insulating films 4 and 5 are formed thereon.

As described above, in the liquid crystal device 100 of this embodiment, by forming a plurality of unit circuits 101*e* corresponding to a plurality of pixel rows offset in the X-direction from the regions extending in the Y-direction from the corresponding pixel rows, the spaces that have heretofore been separated on both sides of the data-line driving circuit 101 are gathered into the free region 10*x* in the center of the region in which the dataline driving circuit 101 is formed, and the identification marks 40 are placed in the free region 10*x*. Therefore, a portion of the peripheral region of the image display region 10*a* which has heretofore been occupied by the identification marks 40 can be included in the region in which the data-line driving circuit 101 is formed. Consequently, as shown in FIG. 2 in which the outline (substrate edges 113 and 114) of the liquid crystal device 100 of this embodiment is shown by a solid line and the outline of the conventional liquid crystal device is shown by a one-dot chain line, the peripheral region (frame region 100*b*) of the liquid crystal device 100 can be narrowed.

Figure 12:
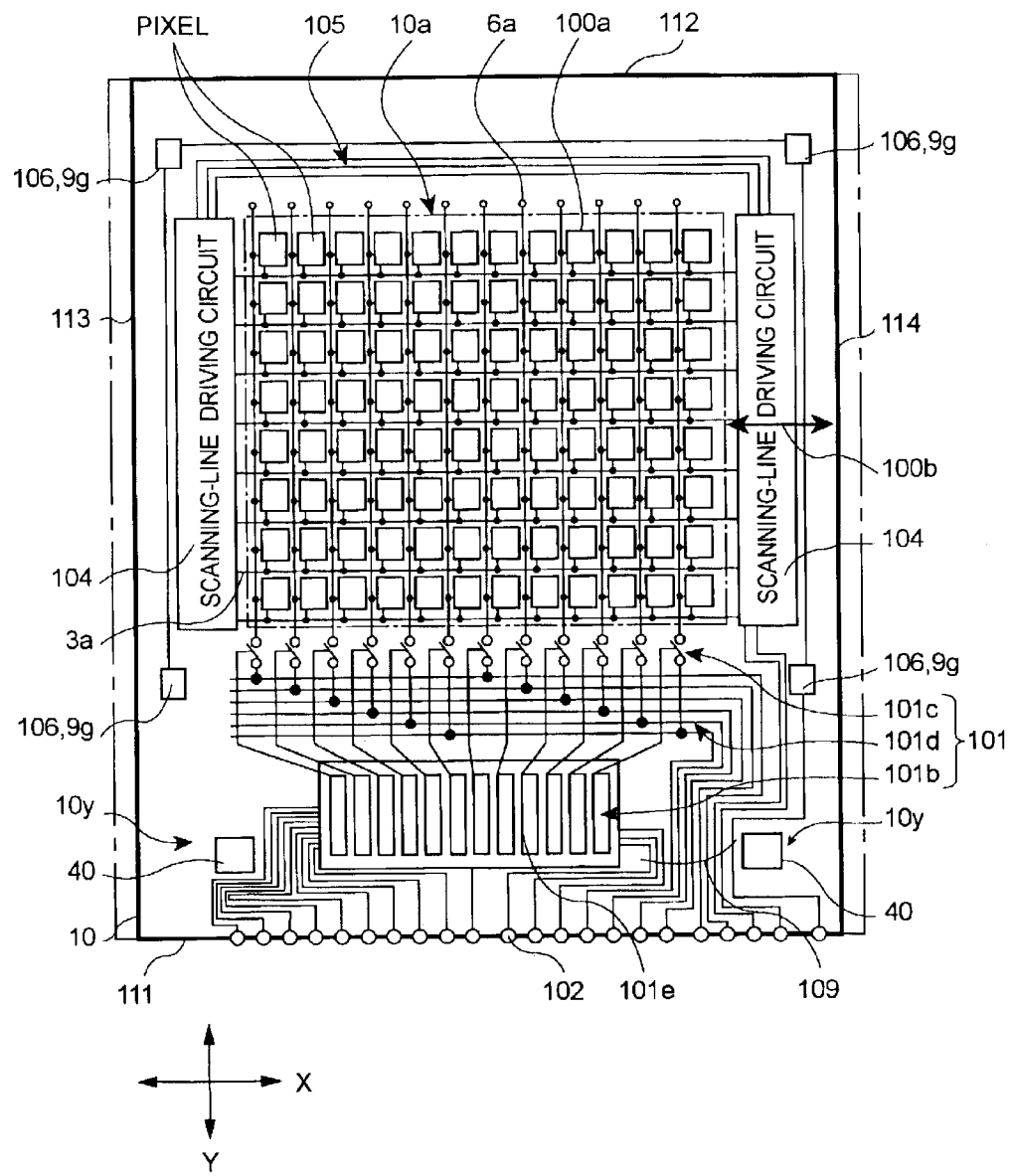
FIG. 12 is a block diagram schematically showing the configuration of a TFT array substrate used in a liquid crystal device according to a second embodiment of the present invention.

FIG. 12 is an exemplary block diagram schematically showing the configuration of a driving-circuit integrated TFT array substrate 10 used in a liquid crystal device 100 of this embodiment. Since the basic structures of the liquid crystal device of this embodiment and liquid crystal devices of the below-described embodiments are the same as those in the liquid crystal device of the first embodiment, descriptions will be given only of characterizing portions of the embodiments. Common components are denoted by the same reference numerals, and descriptions thereof are omitted.

In FIG. 12, shift register circuits 101*b*, sample hold circuits 10*c*, and the like in a data-line driving circuit 101 are formed in a one-to-one-correspondence with data lines 6*a* and pixel rows connected thereto in the TFT array substrate 10 of this embodiment, in a manner similar to that in the first embodiment. The sample hold circuits 101*c* are formed in the regions extending in the Y-direction from the forming regions of the corresponding data lines 6*a* and the pixel rows connected thereto. Consequently, the X-direction pitch of the sample hold circuits 101*c* is equal to the X-direction pitch of the pixel rows.

In contrast, a plurality of unit circuits 101*e* that form the shift register circuits 101*b* are arranged in the X-direction, and the X-direction pitch of the unit circuits 101*e* is shorter than the X-direction pitch of the pixel rows. For this reason, the unit circuits 101*e* are formed offset in the X-direction from the regions extending in the Y-direction from the forming regions of the corresponding pixel rows are formed. Two free regions 10*y* in which the unit circuits 101*e* are not placed are formed on both sides of the region in which the data-line driving circuit 101 is formed.

In this embodiment, an identification mark 40 that has been described with reference to FIGS. 10 and 11 is formed in each of the two free regions 10*y*.

In this way, in the liquid crystal device 100 of this embodiment, the spaces that have heretofore been formed between the unit circuits 101*e* are gathered into the free regions 10*y* on both sides of the data-line driving circuit 101, and the identification marks 40 are placed in the free regions 10*y*. Therefore, in this embodiment, a portion of the peripheral region of an image display region 10*a* that has heretofore been occupied by the identification marks 40 can be included in the region in which the conventional data-line driving circuit 101 is formed. Consequently, as shown in FIG. 12 in which the outline (substrate edges 113 and 114) of the liquid crystal device 100 of this embodiment is shown by a solid line and the outline of the conventional liquid crystal device is shown by a one-dot chain line, the peripheral region (frame region 100*b*) of the liquid crystal device 100 can be narrowed.

Figure 13:
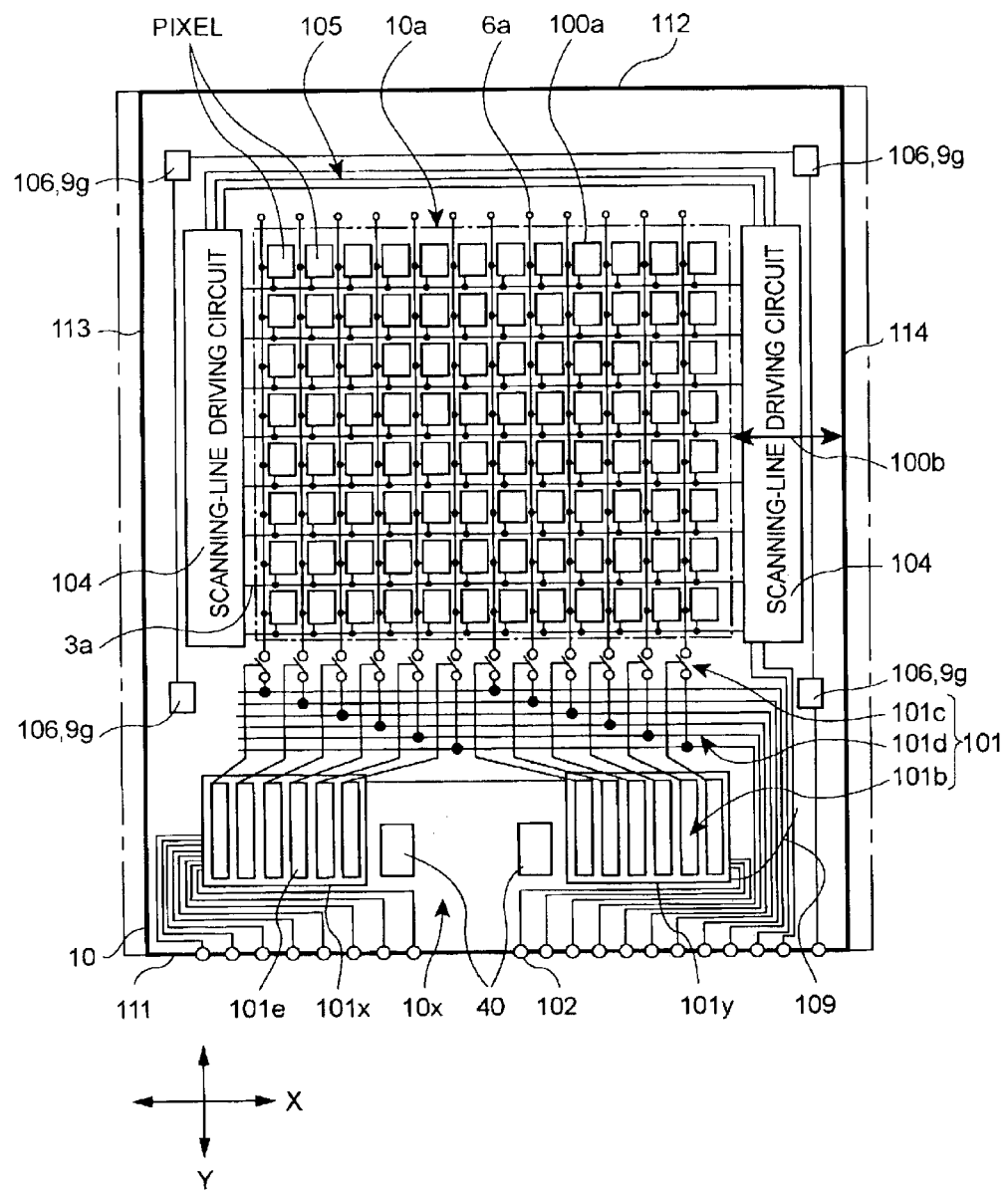
FIG. 13 is a block diagram schematically showing the configuration of a TFT array substrate used in a liquid crystal device according to a third embodiment of the present invention.

FIG. 13 is an exemplary block diagram schematically showing the configuration of a driving-circuit integrated TFT array substrate 10 used in a liquid crystal device 100 of this embodiment.

In FIG. 13, shift register circuits 101*b*, sample hold circuits 10*c*, and the like are formed in a one-to-one correspondence with data lines 6*a* and pixel rows connected thereto in a data-line driving circuit 101 of this embodiment, in a manner similar to that in the first and second embodiments, and the sample hold circuits 101*c* are formed in regions extending in the Y-direction from the forming regions of the corresponding data lines 6*a* and the pixel rows connected thereto. Consequently, the X-direction pitch of the sample hold circuit 101*c* is equal to the X-direction pitch of the pixel rows.

In contrast, a plurality of unit circuits 101*e* that form the shift register circuits 101*b* are arranged in the X-direction. In this embodiment, the unit circuits 101*e* are formed in two unit-circuit forming regions 101*x* and 101*y* spaced from each other in the X-direction, in a manner similar to that in the first embodiment. In the unit-circuit forming regions 101*x* and 101*y*, the X-direction pitch of the unit circuit 10*e* is shorter than the X-direction pitch of the pixel rows, in a manner similar to that in the second embodiment. For this reason, the unit circuits 101*e* are formed offset in the X-direction from the regions extending in the Y-direction from the forming regions of the corresponding pixel rows. A free region 10*x* in which the unit circuits 101*e* are not placed is formed between the unit-circuit forming regions 101*x* and 101*y*.

In this embodiment, two identification marks 40, which have described with reference to FIGS. 10 and 11, are formed in the free region 10*x* between the unit-circuit forming regions 101*x* and 101*y*, and an identification mark is not formed on both sides of the data-line driving circuit 101.

In this way, the spaces that have heretofore been separated on both sides of the data-line driving circuit 101 are gathered into the free region 10*x* in the center of the region in which the data-line driving circuit 101 is formed. Moreover, the spaces that have heretofore been formed between the unit circuits 101*e* are gathered into the free region 10*x*, and the identification marks 40 are placed in the free region 10*x*. Therefore, in this embodiment, the regions on both sides of the data-line driving circuit 101 that have heretofore been occupied by the identification marks 40 can be included in the region in which the conventional data-line driving circuit 101 is formed. Consequently, as shown in FIG. 13 in which the outline (substrate edges 113 and 114) of the liquid crystal device 100 of this embodiment is shown by a solid line and the outline of the conventional liquid crystal device is shown by a one-dot chain line, the peripheral region (frame region 100*b*) of the liquid crystal device 100 can be narrowed.

Figure 14:
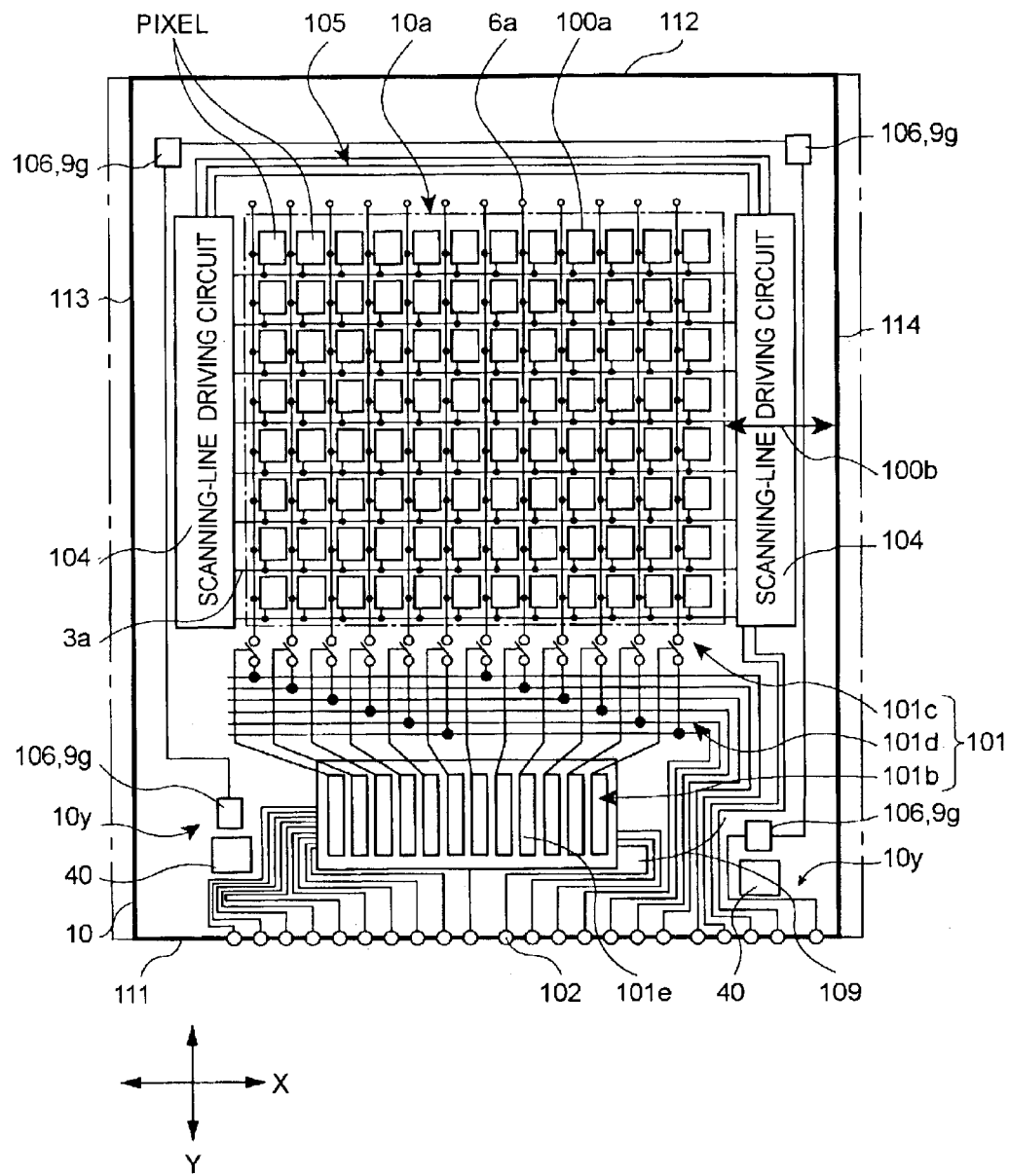
FIG. 14 is a block diagram schematically showing the configuration of a TFT array substrate used in a liquid crystal device according to another embodiment of the present invention.
Figure 15:
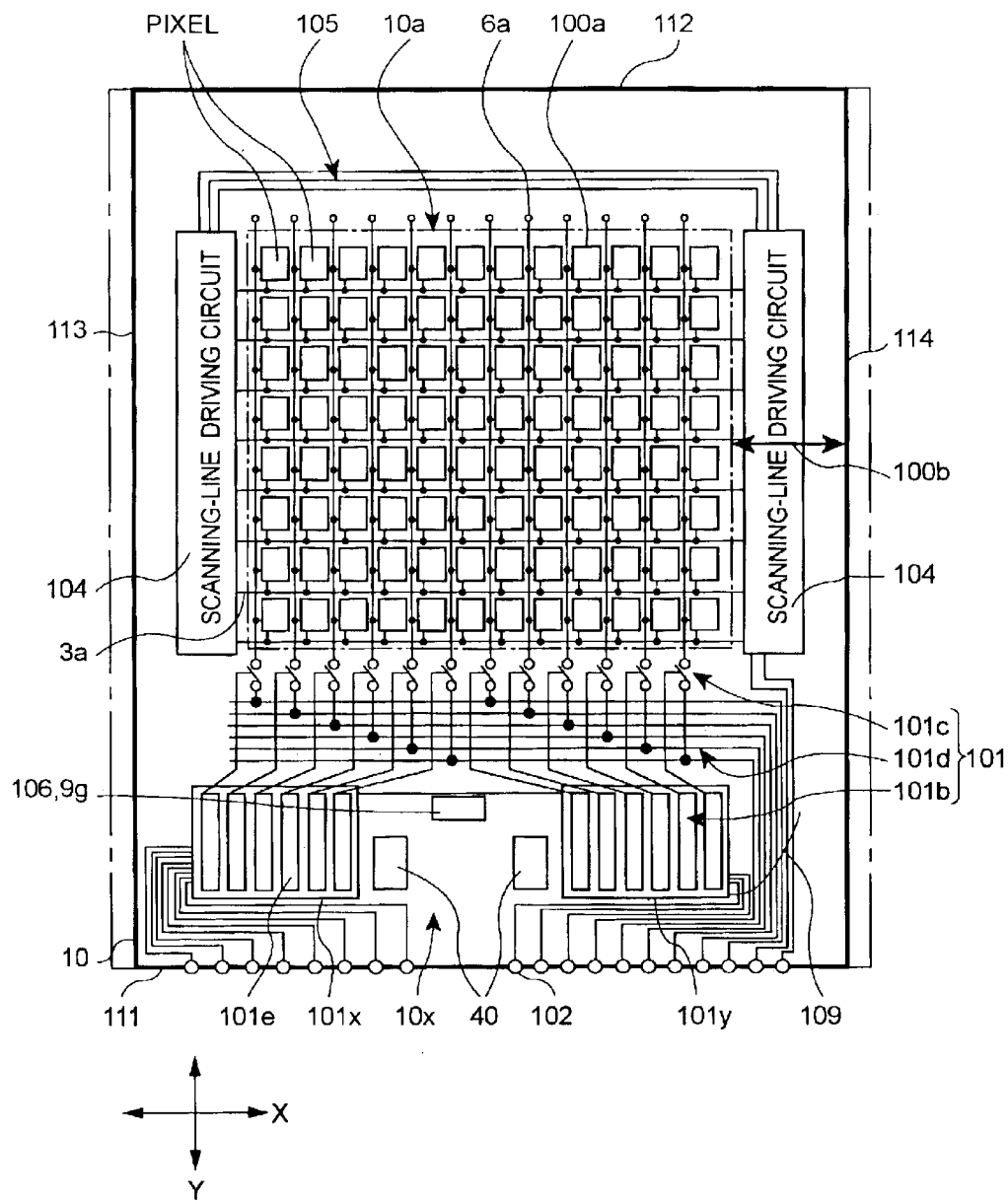
FIG. 15 is a block diagram schematically showing the configuration of a TFT array substrate used in a liquid crystal device according to a further embodiment of the present invention.

While the free regions 10x and 10y are formed by improving the layout of the data-line driving circuit 101 and the identification marks 40 are placed in the regions in the first, second, and third embodiments, conductive electrodes 9g may be placed in the free regions 10x and 10y in addition to identification marks 40, as shown in FIGS. 14 and 15. In an example shown in FIG. 14, identification marks 40 and conductive electrodes 9g are placed in the free regions 10y formed in the TFT array substrate 10 of the second embodiment. In an example shown in FIG. 15, identification marks 40 and a conductive electrode 9g are placed in the free region 10x formed in the TFT array substrate 10 of the third embodiment. In this example, an electric conduction between the substrates is established by the single conductive electrode 9g.

Instead of the above embodiments, only a conductive electrode 9g may be placed in the free regions 10x and 10y.

While two identification marks 40 are formed in the above embodiments, it should be understood that only one identification mark 40 may be formed.

While the layout of the unit circuits 11e in the data-line driving circuit 101 is improved in the above embodiments, shift registers are also formed as unit circuits in a one-to-one correspondence with scanning lines 3a in the scanning-line driving circuit 104. Therefore, a free region in which identification marks 40 and conductive electrodes 9g are placed may be formed by shifting the unit circuits from the extension lines of the scanning lines 3a in the scanning-line driving circuit 104. While the built-in driving circuit has been described as an example in the above embodiments, the present invention is, of course, also applicable to the layout of check circuits.

While the present invention is applied to the TFT array substrate used in the active-matrix liquid crystal device in the above embodiments, it should be understood that it may be also applicable to electrooptic devices using electrooptic substances other than liquid crystal. For example, the present invention may be applied to a TFT array substrate used in an organic electroluminescence display device.

While the semi-transmissive reflective liquid crystal device 100 having such a configuration may be used as a display section for various electronic devices, an example thereof will be described with reference to FIGS. 16, 17(A), and 17(B).

Figure 16:
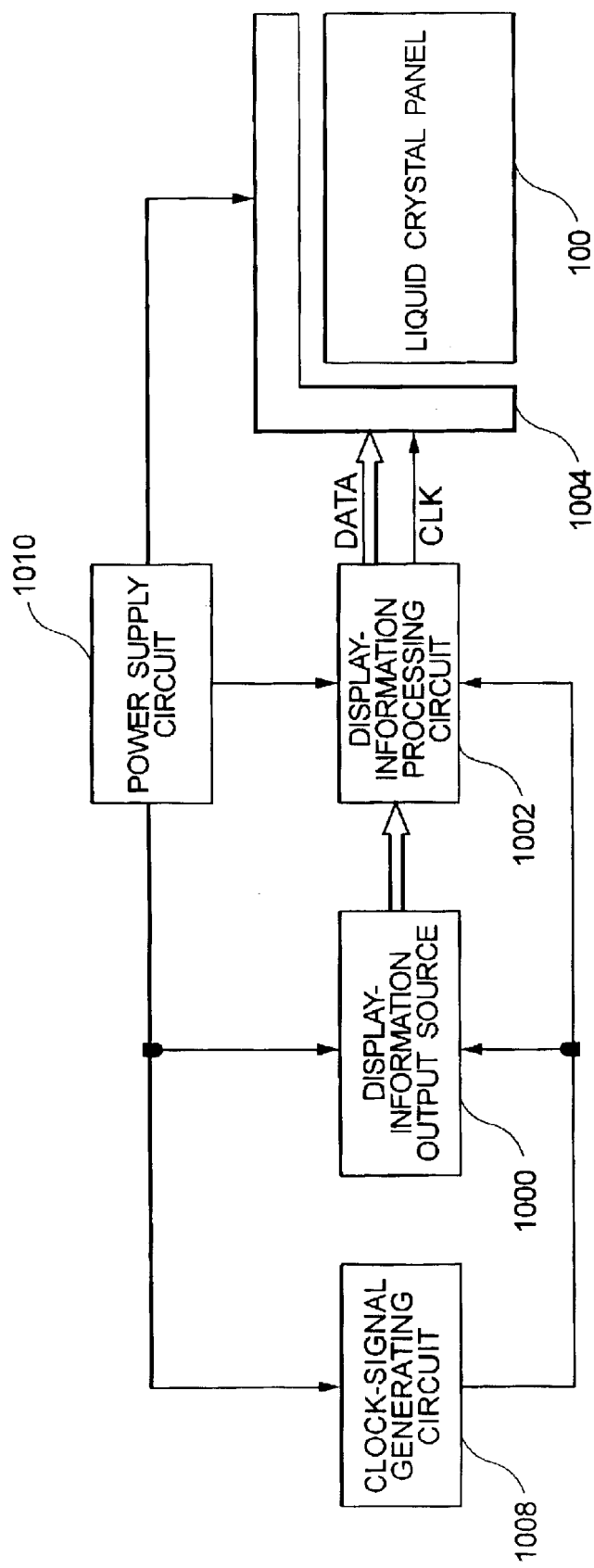
FIG. 16 is a block diagram showing the circuit configuration of an electronic device that uses the liquid crystal device of the present invention as a display device.

FIG. 16 is an exemplary block diagram showing the circuit configuration of an electronic device that uses the liquid crystal device of the present invention as a display device. In FIG. 16, the electronic device includes a display information output source 1000, a display-information processing circuit 1002, a power supply circuit 1010, a clock-signal generating circuit 1008, and a liquid crystal device 1006. The liquid crystal device 1006 includes a liquid crystal display panel 100 and a driving circuit 1004. The above-described liquid crystal device 100 may be used as the liquid crystal device 1006.

The display-information output source 1000 includes a memory, such as a ROM (Read Only Memory) or a RAM (Random Access Memory), a storage unit, such as various disks, a synchronizing circuit for synchronously outputting digital image signals, and the like, and supplies display information, such as a predetermined-format image signal, to the display-information processing circuit 1002 according to various clock signals generated by the clock-signal generating circuit 1008.

The display-information processing circuit 1002 includes various known circuits, such as a serial-parallel conversion circuit, amplifying and inverting circuits, a rotation circuit, a gamma correction circuit, and a clamp circuit, processes input display information, and supplies an image signal corresponding thereto to the driving circuit 1004 with a clock signal CLK. The power supply circuit 1010 supplies a predetermined voltage to each component.

Figure 17:
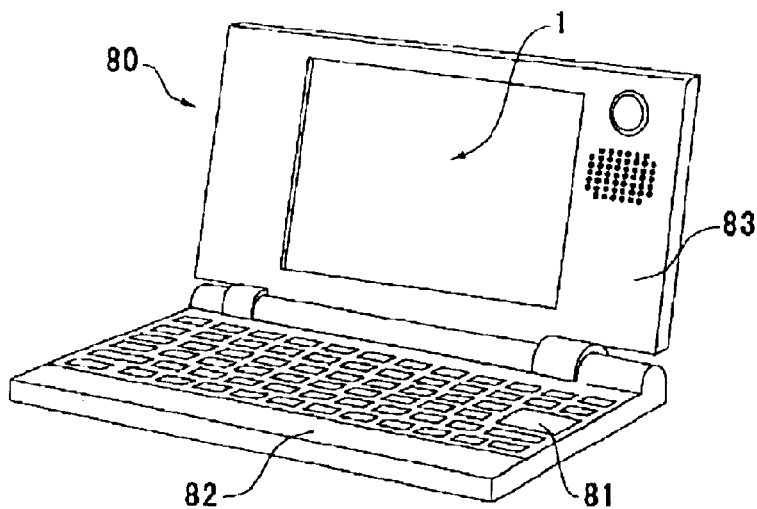
FIGS. 17(A) and 17(B) are explanatory views showing a mobile personal computer and a portable telephone that use the liquid crystal device of the present invention.
Figure 17:
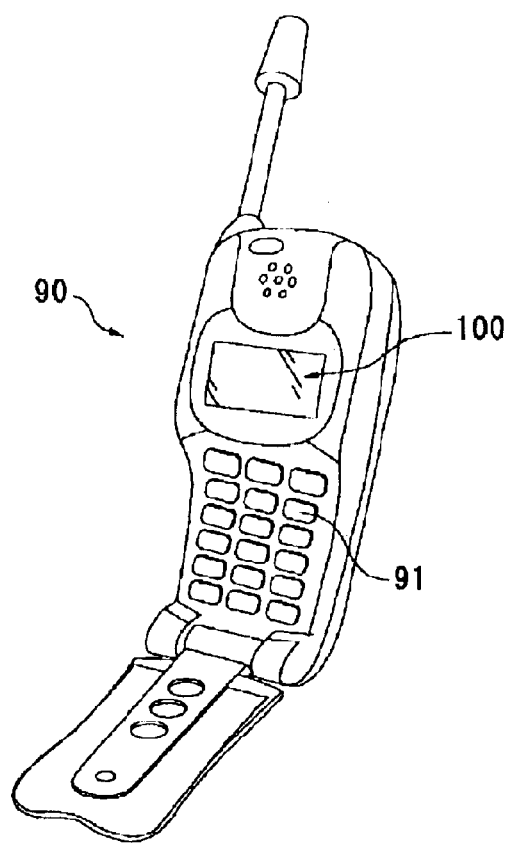

FIG. 17(A) shows a mobile personal computer as an electronic device according to an example of the present invention. A personal computer 80 shown herein includes a body section 82 having a keyboard 81, and a liquid crystal display unit 83. The liquid crystal display unit 83 includes the above-described liquid crystal device 100.

FIG. 17(B) shows a portable telephone as an electronic device according to another example of the present invention. A portable telephone 90 shown herein includes a plurality of control buttons 91, and a display section formed of the above-described liquid crystal device 100.

As described above, in the present invention, by forming a plurality of unit circuits corresponding to a plurality of pixel rows offset in the X-direction from the regions extending in the Y-direction from the positions of the corresponding pixel rows, the dispersed spaces are gathered into a free region in which a unit circuit is not formed, and identification marks and conductive electrodes are placed in the free region. Since the portion of the peripheral region of the image display region that has heretofore been occupied by the identification marks and the conductive electrodes can be placed in the region in which the peripheral circuits are formed, the peripheral region can be narrowed. As a result, it is possible to reduce the size of the display devices to increase the number of devices to be obtained from every unit substrate, and to reduce the manufacturing cost.

What is claimed is:

1. An electrooptic device comprising, on a substrate:
    an image display region in which a plurality of pixels are arranged at a predetermined pitch in X- and Y-directions intersecting on said substrate;
    a peripheral circuit disposed in a region adjacent in the Y-direction to said image display region; and
    a plurality of unit circuits corresponding to a plurality of pixel rows arranged in the X-direction that are arranged at a predetermined pitch in the X-direction at least in a portion of said peripheral circuit, and said plurality of unit circuits are formed offset in the X-direction from regions extending in the Y-direction from said corresponding pixel rows, so that a free region in which said unit circuits are not formed is formed in a portion of said region adjacent in the Y-direction to said image display region, said portion being adjacent in the X-direction to said portion in which said unit circuits are formed, said free region being formed on both sides or one side adjacent in the X-direction to said portion in which said unit circuits are formed in said peripheral circuit by setting an X-direction pitch of said unit circuits to be shorter than an X-direction pitch of said pixel rows.

2. An electrooptic device according to claim 1, said free region being formed between a plurality of unit-forming regions spaced from each other in the X-direction in said peripheral circuit by forming said unit circuits in said unit-circuit forming regions.

3. An electrooptic device according to claim 1, an identification mark having various data recorded therein being disposed in said free region.

4. An electrooptic device according to claim 1, said substrate having a conductive electrode that is electrically connected to an electrode on a counter substrate opposing said substrate through a conductive material that is held between said substrates, and said conductive electrode being formed in said free region.

5. An electrooptic device according to claim 1, said substrate having a conductive electrode that is electrically connected to an electrode on a counter substrate opposing said substrate through a conductive material that is held between said substrates, and said conductive electrode and an identification mark having various data recorded therein are formed in said free region.

6. An electrooptic device according to claim 1, said plurality of pixels including pixel electrodes and pixel-switching thin-film transistors, respectively, and said peripheral circuit being a data-line driving circuit in which said unit circuits are formed in a one-to-one correspondence with data lines electrically connected to sources of pixel-switching thin-film transistors.

7. An electrooptic device according to claim 1, said plurality of pixels including pixel electrodes and pixel-switching thin-film transistors, respectively, and said peripheral circuit being a scanning-line driving circuit in which said unit circuits are formed in a one-to-one correspondence with scanning lines electrically connected to gates of pixel-switching thin-film transistors.

8. An electrooptic device according to claim 1, said substrate holding liquid crystal as an electrooptic substance.

9. An electronic device having the electrooptic device according to claim 1.

10. An electrooptic device comprising, on a substrate:

an image display region in which a plurality of pixels are arranged at a predetermined pitch in X- and Y-directions intersecting on said substrate;

a peripheral circuit disposed in a region adjacent in the Y-direction to said image display region; and a plurality of unit circuits corresponding to a plurality of pixel rows arranged in the X-direction that are arranged at a predetermined pitch in the X-direction at least in a portion of said peripheral circuit, and said plurality of unit circuits are formed offset in the X-direction from regions extending in the Y-direction from said corresponding pixel rows, so that a free region in which said unit circuits are not formed is formed in a portion of said region adjacent in the Y-direction to said image display region, said portion being adjacent in the X-direction to said portion in which said unit circuits are formed, said free region being formed between a plurality of unit-forming regions spaced from each other in the X-direction in said peripheral circuit by setting an X-direction pitch of said unit circuits to be shorter than an X-direction pitch of said pixel rows and by forming said unit circuits in said unit-circuit forming regions.

* * * * *